(No Model.)
E. GRIFFITT.
WHEEL.
No. 587,307. Patented Aug. 3, 1897.
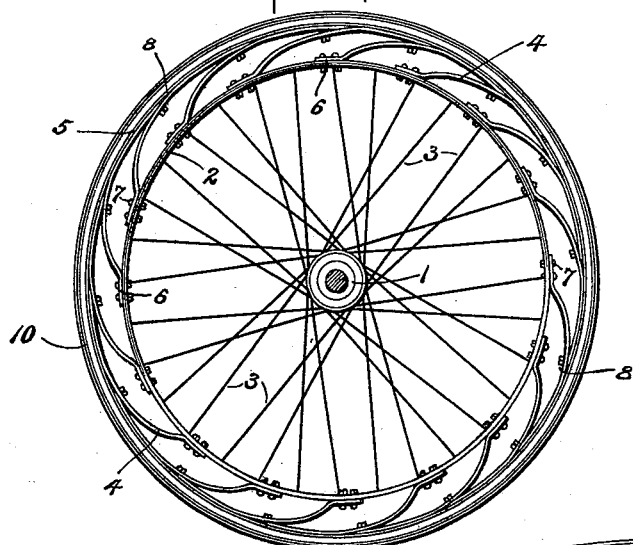
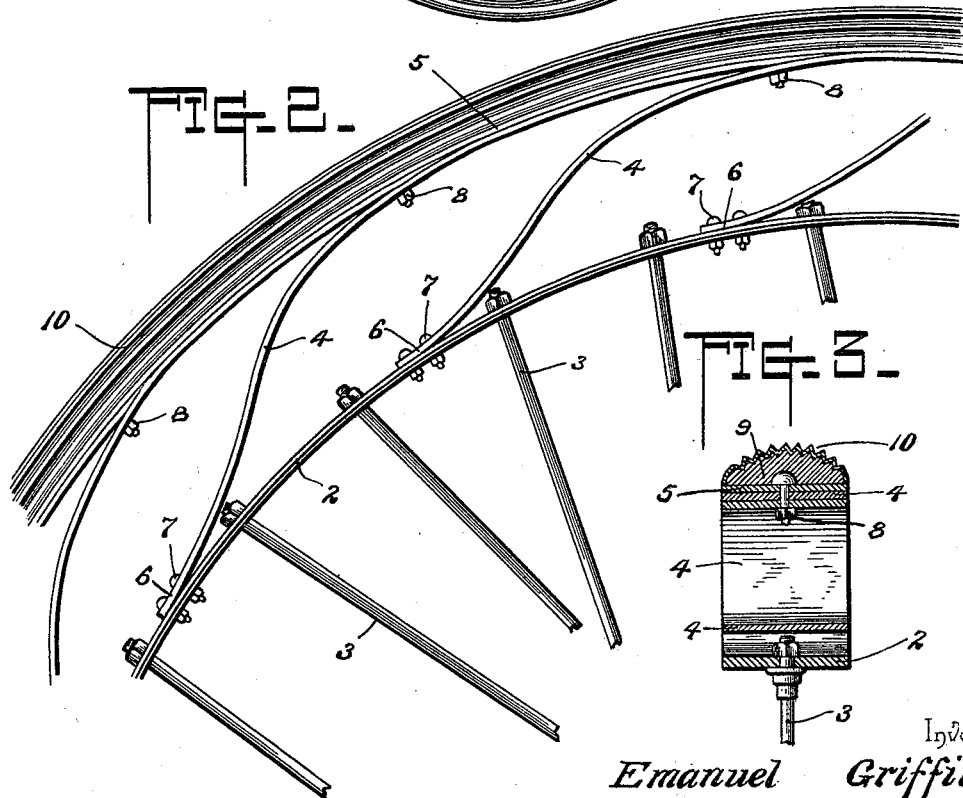
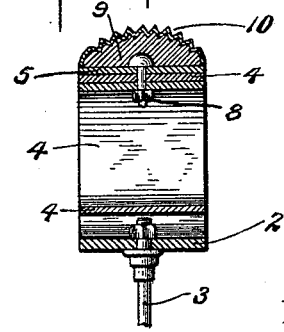
Witnesses
By his Attorneys.
Inventor
Emanuel Griffitt,

UNITED STATES PATENT OFFICE.

EMANUEL GRIFFITT, OF TRION FACTORY, GEORGIA.

WHEEL.

SPECIFICATION forming part of Letters Patent No. 587,307, dated August 3, 1897.

Application filed September 12, 1896. Serial No. 605,638. (No model.)

*To all whom it may concern:*

Be it known that I, EMANUEL GRIFFITT, a citizen of the United States, residing at Trion Factory, in the county of Chattooga and State of Georgia, have invented a new and useful Wheel, of which the following is a specification.

This invention relates to wheels; and the object in view is to provide a novel construction of wheel designed especially for use in connection with bicycles, tricycles, and vehicles of a similar character.

The principal aim of the present invention is to do away with the pneumatic tire in use at the present time and to provide in lieu thereof an elastic or resilient tire composed of a plurality of springs of peculiar shape so combined and arranged as to constitute the outer rim or tread of the wheel or a portion thereof and to enable said rim or tread to yield readily for the purpose of absorbing the vibration caused by riding over rough surfaces and to prevent the transmission of such vibration to the frame of the machine or vehicle.

Other objects and advantages of the invention will appear in the course of the subjoined description.

The invention consists in certain novel features and details of construction and arrangement of parts, as hereinafter fully described, illustrated in the drawings, and embodied in the claim.

In the accompanying drawings, Figure 1 is a side elevation of a wheel constructed in accordance with the present invention. Fig. 2 is an enlarged detail elevation of a portion of the wheel-rim, showing the arrangement of the springs. Fig. 3 is a cross-sectional view of the same.

Similar numerals of reference designate corresponding parts in the several figures of the drawings.

Referring to the drawings, 1 designates the hub of the improved wheel, and 2 the inner rim, which may be composed either of wood or metal, preferably the former, the same being connected with the hub by means of the spokes 3, which may be either direct or tangential, as may be preferred.

4 designates a circular series of springs interposed between the inner rim 2 and an outer rim 5. The inner and outer rims 2 and 5 are made of relative diameters which will admit of any desired amount of annular space between the same, and the springs 4 are secured at one end to the inner rim and at their opposite ends to the outer rim. The springs 4 are bowed or arc-shaped and each is the counterpart of the others. Said springs are disposed somewhat tangentially to both the inner and outer rims in order to secure increased resiliency and each spring is provided at its inner end with a deflected extremity or foot portion 6, which bears flatly against the outer surface of the inner rim, being secured thereto by spaced bolts or rivets 7, which prevent the twisting of the spring. The outer end of each spring is bolted or otherwise secured to the adjoining spring at a point remote from the extremity of said adjoining spring, as shown at 8, and the portion of said adjoining spring between its extremity and the extremity of the other spring forms a portion of the rim or tread of the wheel. The overlapped arrangement of the springs and the bolts 8, arranged at the overlapped parts of the springs, prevent swinging lateral movement of the outer ends of the springs. The springs 4 thus not only provide for the absorption of vibration, but their outer end portions contribute to make up the wheel-rim.

Any desired form of tire may be seated directly upon the outer rim thus formed or an additional wooden or metal rim 9 may be placed around said rim, the outer surface of said rim 9 being convex in transverse section, as shown, and this latter rim may have the tire applied thereto. This tire may be constructed of sheet metal, which is longitudinally corrugated, as shown at 10, for preventing lateral slipping of the wheel in making sharp turns, or any preferred form of rubber tire may be employed, the essential feature of the invention being the springs 4 under their specific arrangement, whereby they afford resiliency to the wheel and at the same time form the rim or a part thereof.

From the foregoing description it will be seen that when the wheel passes over an obstruction all of the springs will be affected and all will contribute to resist the upward pressure of the outer rim and to again return the same to its normal position. For this reason the springs 4 may be constructed of comparatively light material, as the upward thrust of the outer rim is not placed upon one or two springs, but is distributed upon all. This enables the wheel to be made light and strong, so that it is especially adapted for use upon bicycles and light-running vehicles.

Having thus described the invention, what is claimed as new is—

A wheel, comprising an inner rim rigidly connected to the hub, and an outer rim for the reception of the tire surrounding the inner rim and spaced at a distance therefrom, and a plurality of bow-shaped springs disposed tangentially to both rims, said springs being secured at their inner ends to the outer surface of the inner rim by spaced bolts and having their outer ends lapped upon each other and bolts passing through the lapped portions of the springs for holding the same to the outer rim, substantially as described.

In testimony that I claim the foregoing as my own I have hereto affixed my signature in the presence of two witnesses.

EMANUEL GRIFFITT.

Witnesses:
R. H. BAILEY,
E. C. HERNDON.